United States Patent [19]

Morris

[11] 4,184,702
[45] Jan. 22, 1980

[54] WASTE DRAIN COUPLING FOR PLUMBING FIXTURES

[75] Inventor: Earl L. Morris, Whittier, Calif.

[73] Assignee: Acorn Engineering Co., Industry, Calif.

[21] Appl. No.: 913,652

[22] Filed: Jun. 8, 1978

[51] Int. Cl.² .............................................. F16L 35/00
[52] U.S. Cl. ...................................... 285/39; 285/45; 285/59
[58] Field of Search .................... 4/252 R; 285/56, 57, 285/58, 59, 60, 46, 45, 39, 177

[56] References Cited

U.S. PATENT DOCUMENTS

| | | | |
|---|---|---|---|
| 1,044,056 | 11/1912 | Kelly | 285/56 |
| 1,195,685 | 8/1916 | Kelly | 285/46 |
| 1,333,368 | 3/1920 | Auer | 285/59 |
| 2,899,690 | 8/1959 | Clifford | 285/60 |
| 3,409,918 | 11/1968 | Goddy | 285/58 |
| 3,574,670 | 7/1968 | Frank | 285/56 X |

*Primary Examiner*—Dave W. Arola
*Attorney, Agent, or Firm*—Ben E. Lofstedt

[57] ABSTRACT

An improved apparatus for securing, in fluid sealing relationship, the waste outlet of a plumbing fixture to a waste receiving pipe extending through and beyond a mounting structure, such as a wall or a floor, the waste receiving pipe having a radially-extending flange about one end thereof with a plurality of open portions therein for receiving headed fasteners, and the waste outlet of the plumbing fixture extending into the waste receiving pipe, including: an annular fluid sealing gasket with a series of apertures therethrough, one side of which is disposed in intimate contact with the flange of the waste receiving pipe; gasket support means for supporting the other side of the gasket and having a series of apertures therein alignable with the apertures in the gasket, the gasket support means slideably disposed in fluid-sealing relationship about the waste outlet of the plumbing fixture adjacent the end thereof; head fastening means for securing the flange of the waste receiving pipe to the gasket support means; fluid sealing adjustment means for adjusting the fluid sealing relationship between the gasket, the flange of the waste receiving pipe and the gasket support means; and enclosure means for enclosing the gasket, heads of the fastening means and the flange of the waste receiving pipe to render it vandal-proof.

8 Claims, 3 Drawing Figures

WASTE DRAIN COUPLING FOR PLUMBING FIXTURES

BACKGROUND OF THE INVENTION

1. Field of the Invention

The present invention relates to the field of waste drain couplings for plumbing fixtures which provide for connecting the waste outlets of the plumbing fixtures to the inlets of plumbing drains, and more particularly, to those plumbing fixtures having flanged waste outlets.

2. Description of the Prior Art

Prior art waste drain couplings for connecting the waste outlets of plumbing fixtures to plumbing drains consist of rigid couplings and semi-rigid couplings.

Rigid couplings include a compression ring and alignment yoke directly coupled to the waste outlet of a plumbing fixture, typically a toilet or water closet outlet, to the plumbing drain pipe. Examples of these types of direct and rigid couplings are exemplified by U.S. Pat. Nos. 1,988,298 (Burkett) and 2,208,199 (Sisk).

U.S. Pat. No. 1,988,298 incorporates an annular lead washer 28 disposed inbetween the external surface of the wall of the pipe section 24, which is, in turn, connected to the main outlet pipe. In order to effectuate a fluid sealing relationship between these pipes, the lead washer 28 must be crushed to force it into intimate relationship with the pipe 12 and the threads 25 of pipe 24.

In viewing the apparatus disclosed in U.S. Pat. No. 2,208,199, it is observed that a simple and direct threaded coupling is employed to create a similar fluid sealing relationship between the coupling pipe and the main outlet pipe.

Problems encountered in the use of such fluid sealing waste connections are their substantial cost and time-consuming installation sequence. Such joints are installed in the field by pouring molten lead about packing material to effectively "wipe" the pipes and to create the fluid sealing relationship therebetween. Additionally, such couplings are rigid and, as a result of this rigidity, any misalignment between the pipes poses a number of problems.

For example, should radial misalignment exist prior to installation, such misalignment will not permit the creation of a fluid tight seal between the pipes. Further, should misalignment occur following installation, by virtue of the relative movement between the pipes, loss of the fluid tight seal will result, either because of one or both of the pipes breaking, or because of breaking the seal, or by causing the seal material, usually lead, which is a very soft and malleable metal, to become permanently deformed, thereby creating a passageway between the seal and the pipes through which fluid can flow.

Distinctively similar problems are found in the prior art devices disclosed in U.S. Pat. Nos. 1,490,805 (Divekey), 1,706,285 (Frye), and 3,409,918 (Gaddy).

A semi-rigid waste drain coupling is disclosed in U.S. Pat. No. 4,059,289 (Morris, et al.). While offering numerous advantageous over the rigid prior-art waste drain couplings for plumbing fixtures, it is generally limited to those installation applications in which the waste outlet of the plumbing fixture has basically the same internal and external diameter as the waste drain connection.

With the exception of U.S. Pat. No. 4,059,289 (Morris, et al.), it may be readily seen that such prior art assemblies are relatively complex, expensive to construct, and require a substantial time period in which to create the installation.

One object of the instant invention is to provide an inexpensive, labor-saving apparatus for effectuating a fluid sealing coupling between the waste outlet of a plumbing fixture, such as a toilet, to a plumbing drain pipe.

An important object of the present invention disclosed herein is to provide a coupling which is adaptable to incorporate a slip joint type of plumbing pipe drain connection to allow for a relatively substantial variation between the waste outlet of the plumbing drain linked by the present invention herein.

Another important and primary object of the present invention is to provide a waste connection which provides a waste drain coupling which substantially eliminates the problems inherent in rigid joint waste drain applications.

A yet still further important and primary object of the present invention is to provide such a waste coupling device as herein described which is vandal-proof.

Other characteristics, advantages and objects of this invention can be more readily appreciated from the following description and appended claims. When taken in conjunction with the accompanying drawings, this description forms a part of the specification wherein like references and characters designate corresponding parts in several views.

DESCRIPTION OF THE PREFERRED EMBODIMENT

Figure 1:
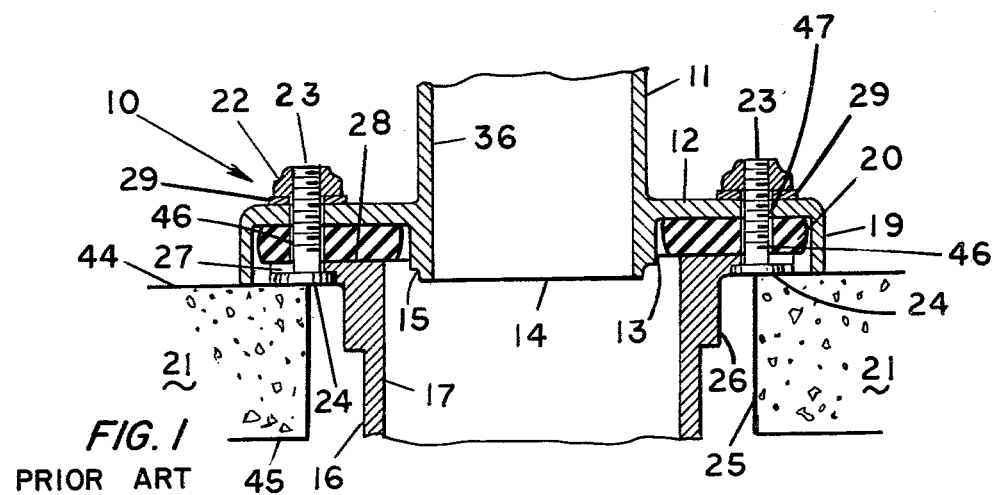
FIG. 1 is a sectional view of the device which is typically found in the prior art.

With continued reference now to the Drawings herein, and with particular emphasis now on FIG. 1, there is shown, in vertical section, a waste drain connection typically found in the prior art and generally indicated at 10.

Generally, the prior art waste connection 10 relates to an apparatus for securing, in fluid sealing relationship, the waste outlet 11 of the plumbing fixture (not shown) to a waste pipe 16. The waste receiving pipe 16 is arranged and passed through a mounting structure 21, such as a floor or a wall, with the end thereof terminating in a flange 12 with a relatively smooth face 28 thereabout which extends beyond the front face 44 of the mounting structure 21. Further, the radially-extending flange includes a plurality of open portions 27, such as slots, typically arranged in pairs oppositely-disposed to one another on either side of the rim of the flang 12, for receiving headed fasteners, as further described hereinafterwards. The waste outlet 11 of the plumbing fixture, in the environment of the present invention, extends into the inside of the waste receiving pipe 16.

Specifically, the prior art waste connection 10 comprises: an annular fluid sealing gasket 20, a gasket support means 12, headed fastening means 24, fluid sealing adjustment means 22, and gasket cover means formed by the walls of the waste outlet 11, flange 12 and the skirt 19 of the flange 12.

With continued emphasis now on FIG. 1, the prior art waste connection 10 incorporates an exposed fastener arrangement. As shown, there is a waste outlet 11 of a plumbing fixture (not shown) having a rim 15 about an outlet 14 of the waste outlet extension 13 which extends into the interior of the waste receiving pipe 16 defined by the internal surface 17. The purpose of the waste outlet extension 13 is to provide a positive means for directing the flow of waste effluent, both liquid, solid, and combinations thereof, directly into the waste receiving pipe 16 without directly impinging any juncture created by the joining of the waste outlet 14 with the waste receiving pipe 16. If such impingement should occur, this would rapidly create an obstacle to the free flow of effluent and increase the risk of the blockage to the free movement of effluent therethrough. Additionally, since the waste outlet 14 of the plumbing fixture is smaller in diameter than the waste receiving pipe 16, the fluid expansion which occurs as the effluent exits the smaller diameter and enters the larger diameter further decreases the resistance to effluent flow therethrough. Surrounding the body of the waste outlet pipe 11 is an outwardly extending, radially disposed flange 12, joined therewith in fixed, fluid sealing relationship therewith, which acts as a gasket support means.

Depending from the rim of the flange 12, is an annular skirt 19, the purpose of which will become apparent as the description proceeds herein.

Headed fastening means are basically bolts which having threaded shanks 23 and heads 24 which are keyed to the open portions 27 of the flange of the waste receiving pipe 16 so as to prevent rotation of the threaded shanks 23 about their axes. As shown, the shanks 23 of the fastening means 42 extend through the aligned open portions 27, the apertures 46 in the gasket 20, and the apertures 47 of the flange 12, and extend therebeyond.

Typically, a washer 29 is passed over the extended shank 23 and a vandalproof nut 22 is threadably mated to the extended shank 23. The washer 29 is used to prevent goughing of the surface of the flange 12 as the nut 22 is adjusted, and to effectively distribute the bias force applied to the flange 12 to prevent premature deformation thereof. A nut 22 is rendered vandalproof if it is formed so that it can only be moved with a special tool not available to unauthorized personnel.

To urge the gasket support means, the flange 12 in FIG. 1, into intimate engagement with the gasket 20, the nuts 22 are tightened. As a result, a fluid sealing relationship is effectuated between the flange 12, the gasket 20 and the face 28 of the flange of the waste receiving pipe 16. The nuts 22 are further tightened until the the skirt 19 comes into intimate contact with the front face 44 of the mounting structure 21. Once this occurs, the skirt 19 and the flange 12, along with the body of the waste outlet pipe 11 of the plumbing fixture and the mounting structure 21, effectively enclose the gasket 20, the heads of the fastening means 42, and the flange of the waste receiving pipe 16, rendering it vandalproof.

Basically, the prior art waste connection 10 arrangement shown in FIG. 1 provides two prominent benefits. First, it directs the effluent in such a manner as to bypass direct flow impingement with the gasket 20, thereby reducing wear to the gasket 20 and the risk of blockage. Second, the installation process of mating the waste outlet 14 with the waste receiving pipe 16 is made easier by virtue of the smaller diameter of the waste outlet 14 mating with the larger diametered waste receiving pipe 16.

However, in high abuse plumbing fixture installations, it is highly desirable to provide a waste connection which cannot be tampered with by unauthorized persons, thereby rendering it vandalproof.

Additionally, installation of such a vandalproof connection should be arranged so that it can be made from the plumbing fixture user's side of the mounting structure 21, either the wall or the floor of the building in which the plumbing fixture is installed.

Figure 2:
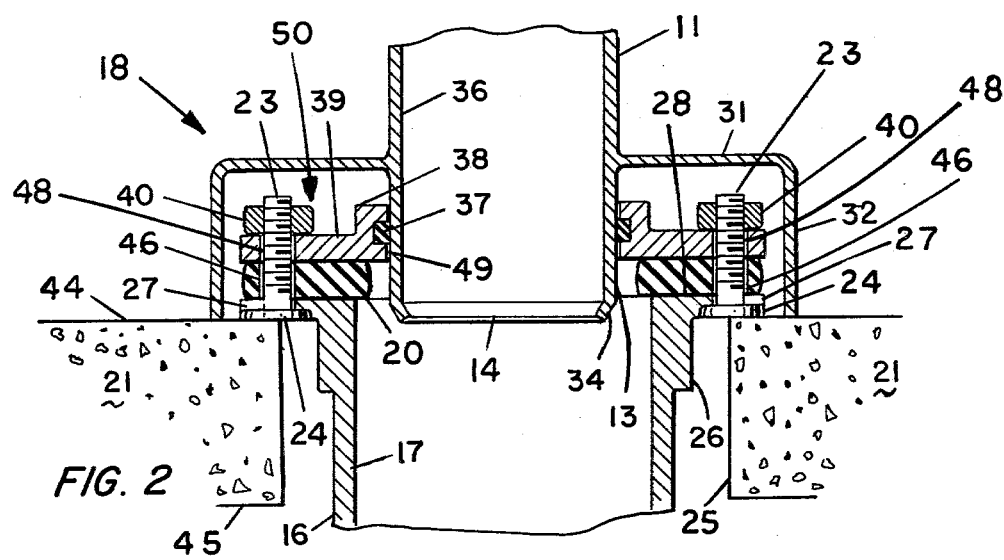
FIG. 2 is a sectional view of the instant invention as applied to a slip-joint type connection wherein the waste drain of a plumbing fixture is coupled to the waste receiving plumbing pipe. No exposed fasteners are present.

With reference now to FIG. 2, the present invention, an improved waste connection, is shown generally at 18. Basically, the present invention comprises an improved apparatus for securing, in fluid sealing relationship, the waste outlet 11 of a plumbing fixture to a waste receiving pipe 16. The waste receiving pipe 16 extends beyond and through a mounting structure 21 via an aperture 25. Disposed about the waste receiving pipe 16 is a radially-extending flange 26 with a smooth face 28 thereabout suitable for mating with a fluid sealing gasket 20 so as to effectuate a fluid seal therewith.

The radially-extending flange 25 has a pair of oppositely-disposed open portions 27, such as slots, in the flange 26 to accomodate headed fastening means, such as bolts having threaded shanks 23 and heads 24, to mate therewith. It should be noted that the heads 24 of the fasteners are sandwiched inbetween the front face 44 of the mounting structure 21 and the flange 26.

The gasket 20, as before, has apertures 46 therethrough to allow the threaded shanks 23 of the fasteners to be passed therethrough, thereby seating the gasket 20 against the smooth face 28 of the flange 26.

An adapter 50 comprising a disc-like member 39 with an opening 49 therethrough which is slightly larger in diameter than the waste outlet extension 13 with apertures 48 in the member 39 which are alignable with the threaded shanks 23 of the fasteners, is used to support the gasket 20 against the face 28 of the flange 26. Nuts 40, which are not of the vandalproof variety, are threadably mated with the threaded shanks 23 of the fasteners, and used to adjustably compress the gasket 20 between the adapter 50 and the flange 26 to effectuate a fluid sealing relationship so that fluid could not pass therebetween.

An O-ring fluid seal 37 is nestingly disposed within a groove 38 about the opening 49. When passed over the waste outlet extension 13, the O-ring seal forms a fluid seal between itself, the groove 38 and the external surface of the extension 13.

With continued emphasis on FIG. 2, a radially-extending flange 31 is fluidly and fixedly secured about the waste outlet 11 of the plumbing fixture. The flange 31 extends beyond the gasket 20 and outside diameter of the adapter 50. About the underside of the flange 31 and depending from the outer rim thereof, is a skirt 32. The combination of the flange 31, the extension 13 of the waste outlet 11 of the plumbing fixture, and the skirt 32 forms a housing, when the skirt 32 is abutted against the front face 44 of the mounting structure 21, for totally enclosing the gasket 20 to render it completely vandalproof.

It should be noted at this time that the prior art design as shown and depicted in FIG. 1 is not a truly vandalproof design, as the nuts 22 are exposed to the user's side of the plumbing fixture. However, in order to provide a measure of security, the nuts 22 are of the vandalproof type, that is, the nuts 22 require a special tool to move them.

Figure 3:
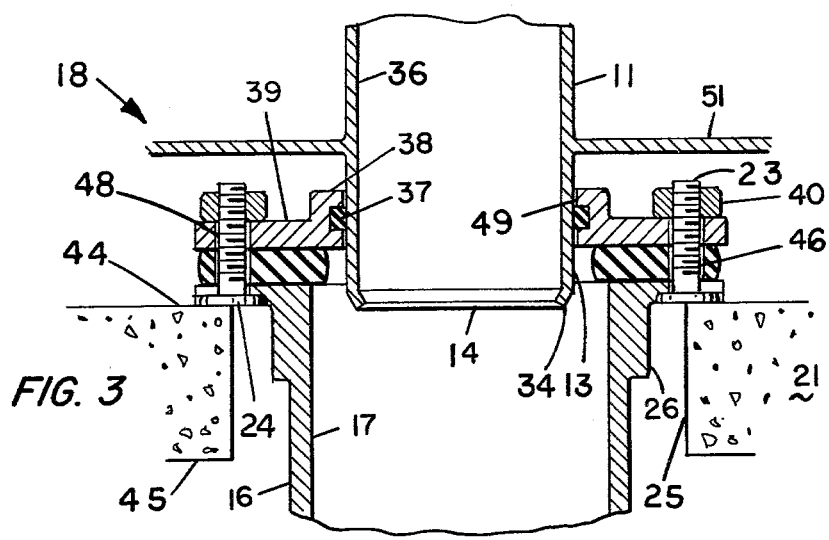
FIG. 3 is a sectional view of the instant invention as applied to a slip-joint type connection wherein the waste drain of a plumbing fixture is coupled to the waste receiving plumbing pipe. The rear portion of the plumbing fixture is covering the fasteners to render it vandal-proof.

However, as clearly seen in FIGS. 2 and 3, once the plumbing fixture is anchored to the mounting structure 21, the improved waste connection 18 forming the present invention herein, is rendered completely vandalproof as it is totally enclosed to prevent access thereto from the user's side of the plumbing fixture.

Another feature of the present invention enhances the installation process. As shown in FIGS. 2 and 3, a beveled edge 34 is disposed about the rim of the outlet 14 of the waste outlet 11 of the plumbing fixture. The beveled edge 34 virtually eliminates the possibility of tearing or goughing the O-ring seal 37 when the installation is made. Further, it enhances the process of alignment during the installation process with the adapter 50 via the opening 49 in the adapter 50.

The embodiment of the invention 18 depicted in FIG. 3 is substantially identical to that shown and illustrated in FIG. 2 with the primarily difference being the use of a continuous surface 51, which typically is the rear surface of the plumbing fixture. Since the surface 51 is relatively large and continuous, access to the nuts 40 and the gasket 20 by unauthorized persons, such as vandals, is effectively prevented.

USE OF THE INVENTION IN EXISTING NON-VANDALPROOF INSTALLATIONS

Existing prior art installations are exemplified by the depiction in FIG. 1 which has been described hereinbefore in detail.

Once the vandalproof nuts 22 are removed from the threaded shanks 23 of the fasteners, the plumbing fixture along with the waste outlet 11 thereof and the gasket support means 12 and the annular skirt 19 can be removed away from the mounting structure 21.

Thereafter, the adapter 50 is aligned via the apertures 48 to the threaded shanks 23 of the fastening means to be placed over the gasket 20 and pressed thereagainst. The nuts 40 are threadably engaged with the threaded shanks 23 of the fastening means and adjusted so that the nuts press the adapter 50 into intimate engagement with the gasket 20, thereby assuring a fluid sealing relationship between the gasket 20 and the smooth face 28 of the flange 26. The waste outlet extension 13 is then manuevered so that the beveled edge 34 of the outlet of the waste outlet 11 of the plumbing fixture is passed into the opening 49 in the adapter 50. Once the extension 13 is passed thereinto, the O-ring seal 37 becomes sealingly engaged therewith and forms a fluid seal thereabout. The plumbing fixture is pressed further towards the mounting structure 21 until the extremity of the skirt 32 contacts the mounting structure 21, thereby enclosing the gasket 20, and the adapter 50 to prevent access thereto.

Of course, the same procedure is used for the embodiment of the invention detailed in FIG. 3, with the rear surface 51 of the plumbing fixture being used to prevent unauthorized access thereto from the user's side of the plumbing fixture.

The invention 18 and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned, except as defined in the accompanying claims.

I claim:

1. An improved apparatus for securing, in fluid-sealing relationship, the waste outlet of a plumbing fixture to a waste receiving pipe extending through and beyond a mounting structure, such as a wall or a floor, the waste receiving pipe having a radially-extending flange about one end thereof with a plurality of open portions therein for receiving headed fasteners, and the waste outlet of the plumbing fixture extending into the waste receiving pipe, comprising:
   (a) gasket means having two sealing surfaces thereon, one sealing surface being disposed against the face of the flange of the waste receiving pipe and further having a plurality of apertures therein alignable with the open portions of the flange;
   (b) gasket support means juxtaposition to the other sealing surface of the gasket means and removably arranged about the body of the waste outlet of the plumbing fixture and extending outwardly in a radial fashion therefrom and further having a plurality of apertures therein alignable with the plurality of apertures in the gasket means;
   (c) fluid sealing means removably secured to the gasket support means and disposed between the gasket support means and the body of the waste outlet of the plumbing fixture and operably arranged in fluid sealing relationship therebetween, the fluid sealing means further permitting movement between the gasket support means and the body of the waste outlet of the plumbing fixture;
   (d) headed fastening means for securing the flange of the waste receiving pipe to the gasket support means;
   (e) fluid sealing adjustment means for moving the gasket support means towards and allowing movement away from the gasket means to effectuate the selection of a fluid sealing relationship and no fluid sealing relationship between the gasket support means, the gasket, and the flange of the waste receiving pipe; and
   (f) means for surrounding the gasket means, the gasket support means, the headed fastening means and the fluid sealing adjustment means to prevent unauthorized adjustment thereof.

2. The apparatus of claim 1, wherein the gasket means is an annular gasket formed of an elastomeric material.

3. The apparatus of claim 1, wherein the gasket support means is movably disposed about the body of the waste outlet of the plumbing fixture.

4. The apparatus of claim 4, wherein the movable gasket support means comprises:
   (a) an annular adapter, the central opening therethrough being larger than the outer diameter of the body of the waste outlet of the plumbing fixture and disposed in contiguous relationship therewith, the rim of the central opening having a groove thereabout; and (b) an O-ring seal operatively nested in the groove about the central opening of the annular adapter so that when the adapter is positioned about the body of the waste outlet of the plumbing fixture, a fluid sealing relationship is effectuated between the annular adapter and the body of the waste outlet of the plumbing fixture.

5. The apparatus of claim 4 further comprising a beveled edge rimming the outlet of the waste outlet of the plumbing fixture to promote ease of engagement with the O-ring seal and to prevent goughing and damage thereto.

6. The apparatus of claim 1, wherein the headed fastening means for securing the flange of the waste receiving pipe to the gasket support means, comprises a plurality of headed bolts having threaded shanks disposed through the aligned apertures in the gasket and the gasket support means and in the open portions of the flange of the waste receiving pipe, the heads of the fasteners having a pair of parallel, straight sides thereon and the sides of the apertures in the flange of the waste receiving pipe having complementary parallel, straight sides to matingly receive the parallel, straight sides of the heads of the fasteners so as to dispose the heads of the fastners in non-rotatable relationship to the sides of the apertures in the flange.

7. The apparatus of claim 6, wherein the fluid sealing adjustment means comprises, in conjunction with the plurality of headed bolts having threaded shanks, a plurality of nuts adapted to be threadably mateable with the threaded shanks of the bolts so as to be axially moveable along the threaded shanks to move the gasket support means towards and allow movement away from the gasket so that when the gasket support means is moved into increasing intimate relationship with said gasket means a fluid sealing relationship is effectuated and when the gasket support means is moved away from the gasket the fluid sealing relationship is broken.

8. The apparatus of claim 7, wherein the plurality of nuts are security-type nuts which are not removable therefrom or adjustable with respect to the threaded shanks by unauthorized persons.

* * * * *